W. A. LIGHTHALL.

TUBULAR CONDENSER.

No. 1,878. Reissued Feb. 21, 1865.

Witnesses.

Francis S. Sou

Ralph Bishop

Inventor.

Wm A. Lighthall

UNITED STATES PATENT OFFICE.

WILLIAM A. LIGHTHALL, OF NEW YORK, N. Y

IMPROVEMENT IN CONDENSERS.

Specification forming part of Letters Patent No. 33,950 dated December 17, 1861; Reissue No. 1,878, dated February 21, 1865.

*To all whom it may concern:*

Be it known that I, WILLIAM A. LIGHTHALL, of the city, county, and State of New York, have invented a certain new and useful Method of Setting Tubes in Tubular Condensers, Heaters, and Refrigerators; and I do hereby declare that the following is a full and exact description of the same, reference being had to the accompanying drawings and to the letters of reference marked thereon, in which—

Figure 1:
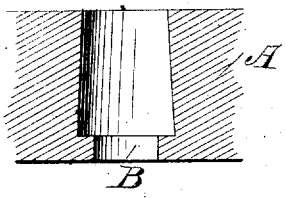
Figure 2:
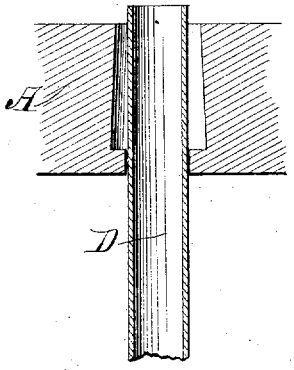
Figure 3:
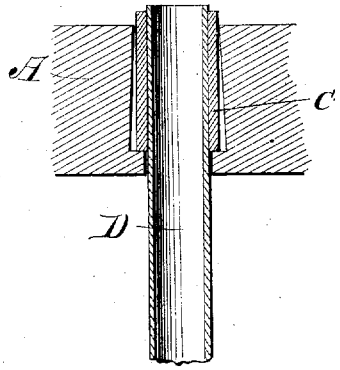
Figure 4:
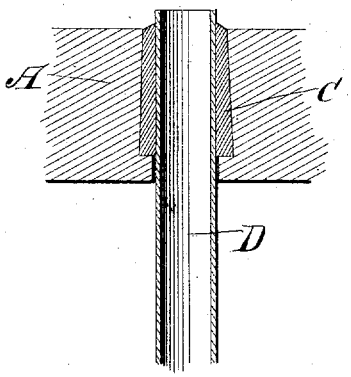
Figure 5:
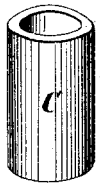

Figure 1 is a sectional (broken) view of a head-sheet, taken through the center of the aperture to receive the tube. Fig. 2 is a similar view showing the tube put in place to be "set." Fig. 3 is a similar view showing the packing placed over the tube and in the aperture. Fig. 4 is a similar view showing the packing "swaged" down to place to secure and set the tube. Fig. 5 is a perspective view of the packing.

It is requisite in tubular condensers for condensing the steam exhausted from steam-engines that provision should be made in setting the tubes in their tube-sheets for the movement of them due to their expansion and contraction, which is produced by the intermission of the exhaust, which occurs twice to each stroke of the engine, and which, therefore, produces two expansions and contractions of the tubes at each of said strokes, the tubes being expanded by the transmission to them of the caloric of the steam brought in contact with them, and contracted (after the steam is condensed) by that caloric being abstracted from them by the current of cooling-water passing through or around them, as the case may be. If the tubes are secured firmly at both ends in their head-sheets, (after the manner of setting boiler-tubes,) their expansion and contraction either causes them to leak in their setting or to bend and break them, in either event rendering them valueless for the purpose for which they are designed. They are now secured at one end firmly in the head-sheet and the other end is allowed to move in a packing formed of india-rubber or other material, secured by a "follower" or other analogous means, which keeps them tight, while it allows them to move freely as they are expanded and contracted. This device is subject to the objection of its first cost and of the constant care required to keep the follower, or its equivalent, in contact with the packing, in order that the packing shall properly perform its office.

My invention is intended to effect the objects sought to be effected by the device above named without being subject to its disadvantages, and consists in forming a packing around the unfastened ends of the tubes (or around both ends of the same, if desired) of rings made of lead or other soft metal, or of india-rubber, or of wood or properly-prepared paper, or of a combination of either of these materials with the other by forming the packing-rings in two or more sections instead of a single section, as shown in the drawings, and in securing the said packing in place in the head-sheet by the formation of the packing-apertures in the said sheet, so that the packing will be securely held without the use of a follower or other analogous device and yet allow the free movement of the end or ends of the tube caused by the expansion and contraction above described.

A is a broken section of a head-sheet, made of cast-iron or other cast metal or composition under my patent of June 11, 1861, the apertures B for the reception of the tubes being enlarged at their outer end for about two-thirds of their depth to form a space to receive the packing, hereinafter described. The enlarged portion of the aperture is made slightly larger in diameter (say one thirty-second of an inch) at the bottom than at the top, so as to hold the packing securely in place. As shown in the drawings, this packing, C, is made of a ring of soft metal of an interior diameter equal to that of the exterior diameter of the tube D, and of an exterior diameter equal to that of the outer end of the aperture B, so as to fill the space between the tube and the aperture, as shown in Fig. 3, and of a length enough greater than the enlarged portion of the aperture B to allow it to be "set down" by a proper tool, so as to be swaged out to fill up the whole of the space between the tube and the aperture, and to be pressed tightly against the exterior of the tube, as shown in Fig. 4, so that it cannot move from its position when the end of the tube is moved by the expansion and contraction before described, while it allows the tube to move freely within it and yet be preserved tight.

I find that lead pipe of proper size, made of soft lead and drawn of equal thickness and cut to proper length, answers an excellent purpose in the manufacture of these packing-rings, not only on account of the readiness with which it can be obtained and fitted, but also for its cheapness; but yet I can employ instead a packing made in two sections, using for one section the lead ring above named, and securing it with the second section formed of wood; or I can employ india rubber or prepared paper for the first section and secure them with a second section of soft lead or other suitable metal, or with a wooden ferrule. These packing-rings, when firmly secured as shown and described, preserve the ends of the tubes perfectly tight in the head-sheet, so far as regards leakage around and past the ends of the tubes, and yet allow them to move to the extent required by their expansion and contraction, as before stated, without the interposition or use of a follower, or other analogous mechanical device to hold them in place.

It will be apparent to practical men that my improvement is equally applicable to securing the tubes of condensers to be employed for condensing the steam evaporated from salt water to be distilled for making potable water and of those of tubular heaters for heating cold water and of tubular refrigerators for cooling warm water, to preserve them from the effects of the sudden expansion and contraction to which they may be subjected when in use.

What I claim as my invention, and desire to secure by Letters Patent, is—

Securing the packing-rings C, or their equivalents or substitutes, as herein described, in the apertures B in the head-sheet A around the ends of the tubes D, without the use of a follower or other analogous mechanical device or arrangement, as herein set forth.

WM. A. LIGHTHALL.

Witnesses:

E. R. VAN BUREN,

JAMES EALER.